(12) United States Patent
Moring et al.

(10) Patent No.: US 6,989,076 B2
(45) Date of Patent: Jan. 24, 2006

(54) METHOD FOR MANUFACTURING RELEASE PAPER

(75) Inventors: Rolf Moring, Lohja (FI); Timo Pahl, Lohja (FI)

(73) Assignee: Lohjan Paperi Oy, (FI)

( * ) Notice: Subject to any disclaimer, the term of this patent is extended or adjusted under 35 U.S.C. 154(b) by 0 days.

(21) Appl. No.: 10/310,452

(22) Filed: Dec. 5, 2002

(65) Prior Publication Data

US 2003/0150580 A1  Aug. 14, 2003

Related U.S. Application Data

(63) Continuation of application No. 09/657,754, filed on Sep. 8, 2000, now abandoned.

(30) Foreign Application Priority Data

Oct. 22, 1999 (FI) .................................. 19992289

(51) Int. Cl.
*D21H 19/82* (2006.01)

(52) U.S. Cl. .................. 162/135; 162/136; 162/137; 162/164.4; 162/206; 162/265

(58) Field of Classification Search .............. 162/135, 162/136, 265, 206, 137, 164.4
See application file for complete search history.

(56) References Cited

U.S. PATENT DOCUMENTS

| | | | | |
|---|---|---|---|---|
| 2,281,340 A | * | 4/1942 | Thiele et al. ............... | 162/265 |
| 3,017,295 A | * | 1/1962 | Outterson et al. .......... | 162/135 |
| 4,223,054 A | | 9/1980 | Schramer et al. | |
| 4,986,883 A | | 1/1991 | Taipale et al. | |
| 5,275,868 A | | 1/1994 | Popat et al. | |
| 5,641,387 A | * | 6/1997 | Baldini ....................... | 162/136 |
| 5,807,781 A | | 9/1998 | Reinhardt et al. | |
| 6,153,054 A | * | 11/2000 | Reinhardt ................... | 162/135 |

FOREIGN PATENT DOCUMENTS

| | | |
|---|---|---|
| EP | 0 095 093 A1 | 5/1983 |
| JP | 4-174798 | 6/1992 |
| JP | 5-279996 | * 10/1993 |
| JP | 6-136700 | 5/1994 |
| JP | 6-200500 | 7/1994 |
| JP | 7-196994 | 8/1995 |
| JP | 9-87998 | 3/1997 |
| JP | 5-279996 | 10/2003 |
| WO | PCT/FI00/00868 | 10/2000 |

OTHER PUBLICATIONS

Casey, Pulp and Paper, 3$^{rd}$ ed., (1983), John Wiley & Sons, p 2472.*

Derwent 1999-128793, Oji Paper Co., "Released Paper Production by Compressing a Single Glazed Paper using a Multistage Calender".

* cited by examiner

*Primary Examiner*—Peter Chin
(74) *Attorney, Agent, or Firm*—Fitch, Even, Tabin & Flannery

(57) ABSTRACT

In the method, a release layer is formed on base paper to manufacture release paper. The base paper is calendered before forming the release layer in-line on the same production line. A further object of the invention is equipment for manufacturing release paper, which equipment can be used to form a release layer on top of a base paper. The equipment comprises a calender (4) located before the release layer forming unit (5) in-line on the same production line.

4 Claims, 1 Drawing Sheet

METHOD FOR MANUFACTURING RELEASE PAPER

Figure 1:
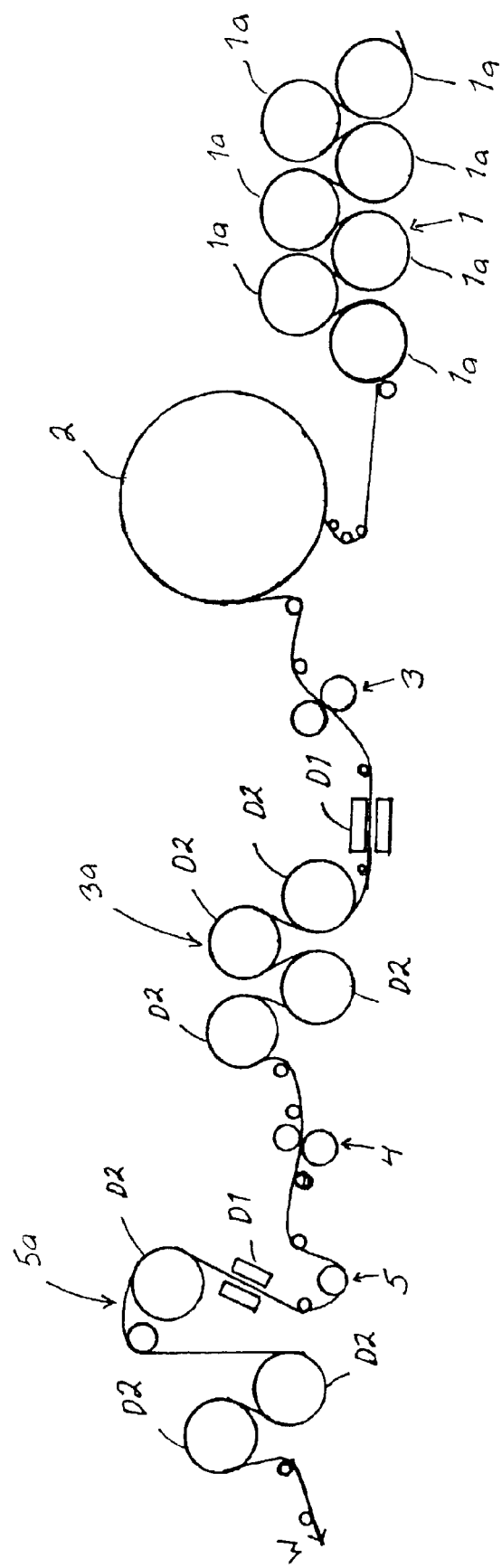

This is a continuation, of prior application Ser. No. 09/657,754, filed Sep. 8, 2000 now abandoned, which is hereby incorporated herein by reference in its entirety.

The object of this invention is a method and equipment for manufacturing release paper.

The terms base paper, release layer and release paper will be used in this application. Base paper means the paper on which a release layer is formed. The release layer is formed on the surface of the base paper, for instance, by coating, and it can be, for instance, a layer hardened by cross-linking a silicone-based liquid chemical. Release paper refers to the combination of base paper and release layer, i.e. base paper with a release layer already formed on its surface. In this application calendering refers to a treatment of the paper web in such a way that its density increases and both surfaces of the web become smoother than before the treatment.

Certain special properties are required of release paper for it to fulfill its purpose. One major end-use application of release paper is label backing paper. The following requirements among others are placed on label backing papers:
the base paper must be free of dust, holes, creases and wrinkling;
the surface of the base paper must be impermeable so that the substance forming the release layer cannot penetrate the paper;
the base paper may not prevent the chemical reaction that leads to the hardening of the release layer;
the necessary adhesion must exist between the surface of the base paper and the release layer, so that the release layer does not come off with the adhesive glue;
the release layer must be non-porous and smooth;
the release paper must be of uniform thickness; and
the face paper and its glue must peel off the release paper used as base paper with equal release force at every point.

Release papers are previously known, for instance, from patent specifications U.S. Pat. Nos. 5,084,354, 5,275,868 and DE 42 11 510. The specification U.S. Pat. No. 5,084,354 presents a release paper which is a siliconised sulphate pulp paper rendered impermeable. Patent specification U.S. Pat. No. 5,275,868 presents a release paper which is a siliconised, supercalendered paper. Specification DE 42 11 510 presents a release paper manufactured by the Clupak method, which is run when moist between a rotating roll and an elastic belt, by which means a smooth surface is obtained for the paper.

The products for whose manufacture the present method is to be used include high-quality release paper applications, such as laser copier labels, product labels, decorative labels, book labels, consignment note pockets, self-sealing envelopes, floor tiles, textile laminates, chewing gum wrappers and dust rollers. Sometimes the manufacturing method is also needed with packaging tapes, form labels and hygiene products.

Many release paper applications require better smoothness and higher paper density than can be achieved by present manufacturing methods, unless the paper surface has already been calendered in the earlier manufacturing stages. For pre-coated siliconised MG (machine glazed) paper, a smoothness of 3 $\mu$m measured by PPS roughness, and a density of 700 kg/m$^3$ are typically achieved. Such a release paper is only applicable for limited end uses, such as some hygiene products. The testing of PPS Parker Print Surf) roughness is described in the UK standard BS 6563:1985. The method is based on measuring the amount of air flowing between a paper placed on an elastic rubber base and a metal ring placed on top of it.

An adequate smoothness could be achieved by calendering, but calendering is not possible after forming the release layer, because the process would render the release layer useless in terms of release properties. Separate calendering and forming of the release layer, on the other hand, are expensive processes and increase the volume of reject.

The above-mentioned problems can be solved by the method and equipment relating to this invention. The method is characterised in that the base paper is calendered in-line before forming the release layer. The equipment is characterised in that it comprises a calender roll before the release layer forming unit on the same production line.

In the new more advanced method, the calendering of paper and the forming of the release layer are carried out in-line on the paper machine.

The section of the paper machine following the drying section comprises equipment which enables the production of release paper in-line. The base paper can be either surface treated, for instance pre-coated or surface sized, or untreated. The same combination of calendering and release layer formation can be applied in the forming of the release layer on a separate off-machine coating/finishing unit. A wider range of base paper grades can be used than with prior methods. A PPS roughness of 2 $\mu$m and a density of 900 kg/m$^3$ have been achieved for release paper manufactured by the new method. Such release paper can be used as backing paper for paper and plastic coated adhesive laminates and for other demanding end-use applications. The new manufacturing method also improves the smoothness of the back of the release paper, which makes it suitable for demanding printing jobs. This is important, for instance, when the product's instructions for use or product specification including small details or multi-colour printing are printed on the back of the release paper. High-quality printing is also required in packages made of release paper, in which the release layer is wrapped against the product and the back of the paper forms the package's outer surface.

In the following, the invention is described in more detail with reference to FIG. 1, which shows a side view of part of the release paper production line.

FIG. 1 is a schematic view of the web running on the paper machine and does not show all details.

The beginning of the base paper production line is conventional and the paper machine comprises the equipment needed for the generally known papermaking stages. The section of the paper machine following the so-called wet end in FIG. 1 comprises the dryer group 1, drying cylinder 2, pre-treatment unit 3, intermediate calender 4 and coating unit 5.

The dryer group 1 comprises drying cylinders 1a and at least one drying wire (not shown in the drawing). The drying cylinder 2 following the dryer group is preferably a drying cylinder which glazes the base paper on one side, i.e. the drying cylinder 2 can be, for instance, a so-called MG cylinder. After the drying cylinder 2 comes the pre-treatment unit 3, which can be, for instance, a coating unit or a surface sizing unit. The pretreatment unit may comprise two rolls opposite each other, both of which incorporate feeding members for the desired pre-treatment substance, so that the paper web can, if desired, be treated on both sides. The web is wetted in the pre-treatment unit 3, from which it is conveyed to the first finishing section 3a for drying. The first finishing section 3a comprises the equipment needed for drying, for instance drying cylinders D2, drying wires (not shown in the drawing) and/or non-contacting drying devices, such as infrared dryers D1. The pre-treatment unit is not essential, and the equipment relating to the invention can also be implemented without the pre-treatment unit 3. If the base paper is to be pre-coated or surface sized in the pre-treatment unit 3, the amount to be used is 0.5–30 g dry substance/m$^2$, preferably 1–20 g dry substance/m$^2$ After the pre-treatment unit 3 comes the intermediate calender 4, on which the base paper is calendered to achieve suitable surface roughness and density properties for the end product. In the intermediate calender 4, the base paper passes through at least one nip. The intermediate calender 4 used for intermediate calendering can be any calender suited for this purpose. It may, for instance, be a single-nip hard machine calender, a single-nip soft calender, supercalender or a multi-nip calender. One of the rolls of the soft calender has a soft surface, for instance made of polymer, which causes the length of the nip to change as the compression pressure changes. The roll opposite to the soft-surfaced roll on the soft calender has a hard surface. The rolls of the multi-nip calender may have either soft or hard surface. The multi-nip calender may also comprise more than one stack of rolls.

After intermediate calendering, the release layer is formed on the base paper by means of a suitable coating method in the coating unit 5, on a surface that has been dried against a smooth surface, such as the surface of a MG cylinder. Usually a release layer is only formed on one side of the base paper. The release layer is made of a chemical which is dried after it has been spread on the surface of the base paper. The finished release layer has a low surface energy, which means that the surface in contact with the release layer, such as adhesive glue or a product wrapped in the release paper, comes away from the release paper with little effort. The chemical substance forming the release layer may, for instance, be a silicone-based emulsion, which is applied to the base paper in the coating unit 5. The amount of substance used to form the release layer is usually 0.1–20 g dry substance/m$^2$. When using silicone-based chemicals to form the release layer, the amount to be used is usually 0.1–5 g dry substance/m$^2$, preferably 0.3–3 g dry substance/m$^2$. After forming the release layer, the silicone-based chemical is polymerised and hardened by application of heat. This takes place in the second finishing section 5a, which comprises equipment for web drying similar to that in the first finishing section 3a, i.e. for instance drying cylinders D2 and/or infrared dryers D1. The finished release paper web W is passed on to the next stage, which is normal winding. In addition to what has been said above, FIG. 1 shows device for guiding the web, such as auxiliary rolls, which are not given reference numbers.

It is also possible to manufacture a finished adhesive product in-line on the paper machine. In this case, the back of the finished release paper can be printed. A self-adhesive layer is then formed on top of the release layer and dried. After possible re-wetting, the release paper and the face paper, unwound from a reel, are conveyed to the same nip, in which the self-adhesive laminate is formed.

The base paper can also be manufactured according to prior art on a paper machine and then moved on to a separate paper finishing machine. In this option, the pre-coating or surface sizing can be done either in-line on the paper machine or off-machine on the paper finishing machine. If the pre-coating or surface sizing of the base paper is carried out on the finishing machine, it can be done immediately after the unwinding before calendering or after calendering.

The calendering can be done, for instance, on a self-adhesive label manufacturing machine, on which the base paper is, after unwinding, passed on to a calender, for instance a single-nip hard machine calender, single-nip soft calender, supercalender or a multi-nip calender. Thereafter a release layer is formed on the surface of the base paper, which is dried and hardened by polymerising the release layer by application of heat. After calendering, the back of the release paper can be printed. A self-adhesive layer is then formed on top of the release layer and dried. After possible re-wetting, the release paper and the face paper, unwound from another reel, are conveyed to the same nip, in which the self-adhesive laminate is formed.

The above description does not restrict the invention, and the invention may vary within the scope of the claims. The drying cylinder glazing the surface of the base paper is not necessarily a MG cylinder; it can be any device producing an essentially similar result, such as a Condebelt dryer. The intermediate calender may have more than one nip, or the rolls of the intermediate calender may differ from what has been described above. The construction of the intermediate calender may vary. The pretreatment unit may be located after the intermediate calender, in which case the first finishing section is located after the intermediate calender and pre-treatment unit.

The manufacture of release paper may, depending on the case, comprise other stages than those described above, or some of the stages described above may have been excluded from the process.

The chemical forming the release layer is not necessarily a silicone-based chemical, but it may also be some other chemical or suitable chemical composite, which can be used to form a release layer with a low surface energy on paper surface. If the release layer is a silicone-based chemical, it can be an emulsion, a solvent-based or a solvent-free chemical. The cross-linking of a solvent-free silicone-based chemical can be accomplished by heat, by electron-beam (EB) hardening or by means of radiation, for instance by ultraviolet (UV) radiation. The self-adhesive layer can be formed by the hot melt technique, which means that no drying is needed after the formation of the self-adhesive layer.

In addition to infrared dryers, other non-contacting drying devices can be used, for instance blow dryers, such as airborne web-dryers. The non-contacting drying device does not necessarily have to located before the drying cylinder when drying the layer formed on the paper surface; the paper can be dried by drying cylinders from the reverse side, i.e. the side on which no wet layer has been formed. The main issue in the invention relating to this application is that the base paper of the release paper is calendered on the same production line before forming the release layer.

What is claimed is:

1. A method for manufacturing a siliconized release paper, the method comprising:
   making a base paper;
   running the base paper in line to a dryer;
   drying the base paper in a manner which is effective for glazing at least one surface of the base paper to provide a glazed base paper;
   running the glazed base paper in line to a precoater;
   precoating the glazed surface of the glazed base paper to provide a precoated glazed base paper;
   running the precoated, glazed paper in line to calendering rolls;

calendering the precoated glazed based paper to provide a calendered, precoated and glazed base paper;

running the calendered, precoated and glazed base paper in line to a siliconizer, siliconizing the calendered precoated and glazed surface of the calendered, precoated glazed base paper by applying a release coating composition which includes a silicone composition to provide a siliconized base paper, and curing the release composition to provide a siliconized calendered release paper.

2. The method as recited in claim 1, wherein the release coating composition is applied at a rate of 0.3 to 3g dry substance per square meter of glazed base paper.

3. The method as recited in claim 1, wherein the base paper is dried and glazed with at least one drying cylinder to glaze the base paper at least on one side.

4. The method as recited in claim 2, wherein the base paper is dried and glazed with at least one drying cylinder to glaze the base paper at least on one side.

\* \* \* \* \*